United States Patent
Nakama

(10) Patent No.: US 9,337,996 B2
(45) Date of Patent: May 10, 2016

(54) DATA RECOVERY CIRCUIT

(71) Applicant: FANUC Corporation, Yamanashi (JP)

(72) Inventor: Tomomasa Nakama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/859,432

(22) Filed: Sep. 21, 2015

(65) Prior Publication Data

US 2016/0094333 A1 Mar. 31, 2016

(30) Foreign Application Priority Data

Sep. 29, 2014 (JP) .................................. 2014-199230

(51) Int. Cl.
*H04L 7/00* (2006.01)
*H04L 7/02* (2006.01)

(52) U.S. Cl.
CPC ................ *H04L 7/02* (2013.01); *H04L 7/0054* (2013.01)

(58) Field of Classification Search
CPC ............. H04L 7/04; H04L 7/005; H04L 7/02; H04L 25/069; H04L 27/2338; H04L 7/00; H03L 7/091; G06F 17/5045; G06F 13/4291; H03H 17/0628

USPC ........... 375/371, 362, 372, 226, 326, 32, 325; 341/61, 100, 159; 327/2, 24; 713/503, 713/500

See application file for complete search history.

(56) References Cited

U.S. PATENT DOCUMENTS 7,298,299 B1 * 11/2007 Cheung ................. H04L 7/0338
341/100
2006/0227916 A1 10/2006 Masui et al.

FOREIGN PATENT DOCUMENTS

JP 2006-262165 A 9/2006

* cited by examiner

*Primary Examiner* — Rahel Guarino
(74) *Attorney, Agent, or Firm* — Hauptman Ham, LLP

(57) ABSTRACT

In a data recovery circuit, the position of an edge is detected from parallel data acquired by oversampling data received through serial communication, the position of a next edge is estimated, the estimated position of the edge is compared with the detected position of the actual edge, and the sampling position of the parallel data is adjusted based on a result of the comparison. As a result, an oversampling clock can be set to a maximum frequency, and accordingly, the precision of the data recovery circuit can be improved.

2 Claims, 7 Drawing Sheets

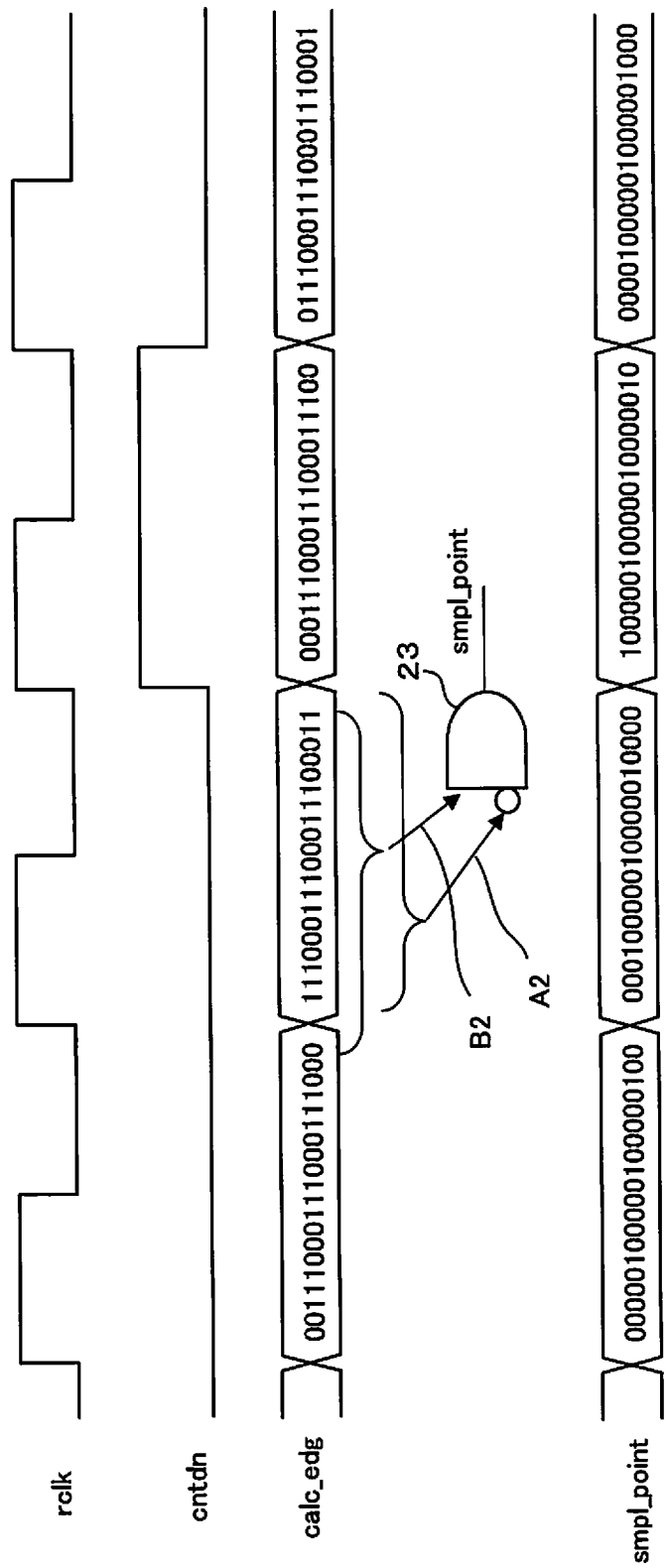

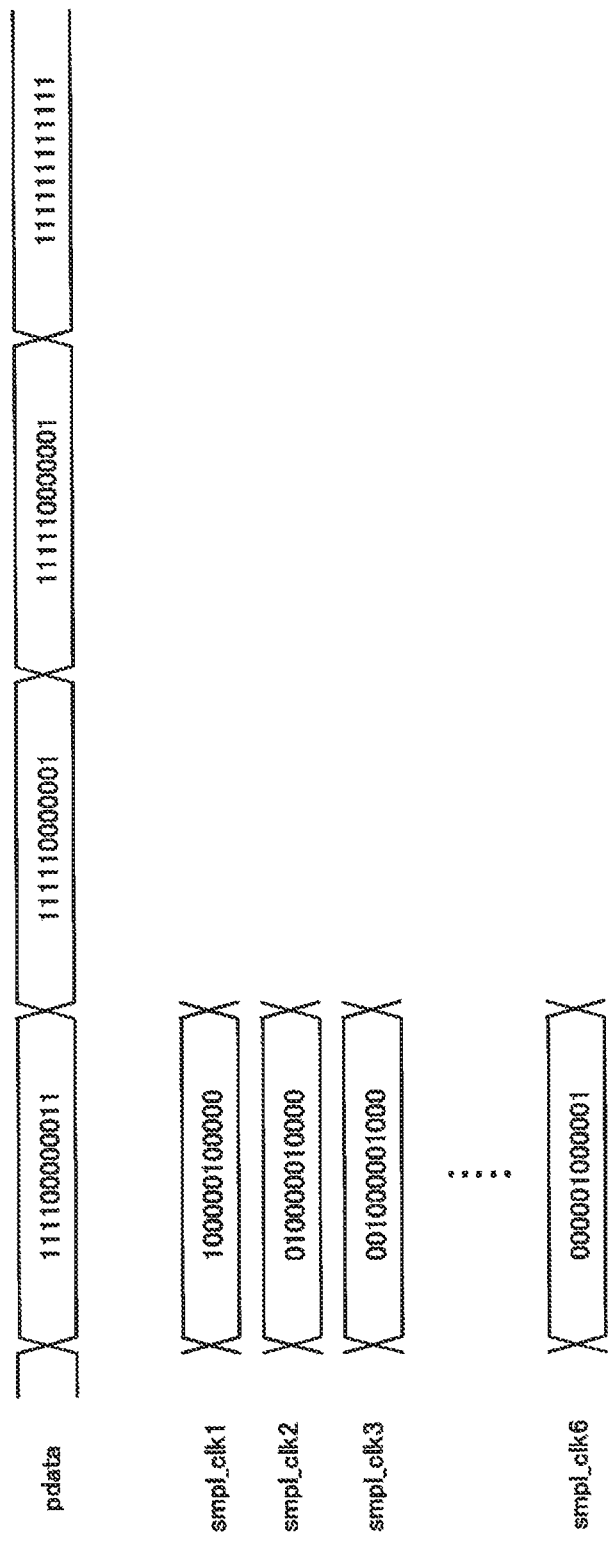

DATA RECOVERY CIRCUIT

RELATED APPLICATIONS

The present application claims priority to Japanese Application Number 2014-199230, filed Sep. 29, 2014, the disclosure of which is hereby incorporated by reference herein in its entirety.

BACKGROUND OF THE INVENTION

1. Field of the Invention

The present invention relates to a data recovery circuit that executes sampling of data with a clock superimposed in the communication data being separated so as to eliminate the influence of frequency deviations of a control clock of each unit in a case where communication is executed among units such as a servo unit.

2. Description of the Related Art

In a case where communication between units is executed, there are cases where a clock data recovery circuit is used which is a data recovery circuit executing sampling of data with a clock superimposed in communication data being separated so as to eliminate the influence of frequency deviations of a control clock of each unit. In a case where the clock data recovery circuit is included in an application specific integrated circuit (ASIC), the clock data recovery circuit is designed dedicatedly for an ASIC vendor. For this reason, in a case where another ASIC having a different communication frequency is generated, it is necessary to newly design a clock data recovery circuit, and accordingly, the development period is long. Here, the ASIC is a customized integrated circuit and is an integrated circuit (IC) designed to have a function specialized for a specific use.

As a means for solving such a problem, for example, a data recovery circuit of an oversampling type disclosed in JP 2006-262165 A may be considered to be used. In such a data recovery circuit, a plurality of clocks having a frequency lower than the transmission rate of serial data are prepared by shifting the phase, and the serial data is sampled to be parallel data by using each clock, and accordingly, the frequency of the used clocks can be lowered, whereby a data recovery circuit can be easily designed.

In such a data recovery circuit of the oversampling type, as the number of times of oversampling for one bit of the serial data for serial communication increases, the sampling position for recovering the serial data can be finely adjusted, whereby the accuracy of recovery can be improved.

However, in the data recovery circuit of the oversampling type disclosed in JP 2006-262165 A, the data rate of the serial communication needs to be an integer multiple of the frequency of the parallel data output by the oversampling circuit such that the edge position of the parallel data acquired by oversampling the serial data is not changed much from the edge position of the previous time (for example, two bits of the serial communication is oversampled to be output as parallel data of one time). For this reason, in a case where the number of bits of the parallel data is determined, the oversampling frequency can be limited to a usable oversampling frequency, and there is a problem in that the number of times of oversampling cannot be set to a maximum value.

FIG. 9 is a diagram that illustrates a conventional data recovery circuit. The data recovery circuit 30 includes an oversampling unit 31, an edge detection unit 32, a sampling clock selection unit 33, a phase comparison unit 34, and a data sampling unit 35.

The oversampling unit 31 samples data received through serial communication by using a clock having a frequency higher than the communication rate of serial data and outputs parallel data (pdata) of n bits and a clock (rclk) having a frequency that is 1/n of the frequency of the clock described above.

In an example illustrated in FIG. 10, the oversampling unit 31 executes oversampling with a frequency that is six times the data rate of the serial communication and outputs two bits of serial communication data as parallel data (pdata) of 12 bits.

The edge detection unit 32 detects an edge position of parallel data (pdata) that is output by the oversampling unit 31. The sampling clock selection unit 33 selects a sampling clock among sampling clocks smpl_clk1 to smpl_clk6 prepared in advance in accordance with a phase control signal (cntdn, cntup) that is output by the phase comparison unit 34. In a case where there is no input of a phase control signal (a signal cntdn representing a change (increase) in the phase or a signal cntup representing a change (decrease) in the phase), the same sampling clock as that of the previous time is output. On the other hand, in a case where a phase control signal (cntdn, cntup) is input, a sampling clock that is increased by one or is decreased by one is output in accordance with the input signal.

The phase comparison unit 34 compares a position edgdata of an edge that is actually detected by the edge detection unit 32 with the edge position of the current sampling clock (smple_clk) and outputs a phase control signal (cntdn, cntup).

The data sampling unit 35 extracts recovery data by using the parallel data (pdata) output by the oversampling unit 31 and the sampling clock (smple_clk) output by the sampling clock selection unit 33 and outputs the extracted recovery data.

In the data recovery circuit 30, in order for the sampling clock selection unit 33 to select a sampling clock, it is necessary that the edge position of the parallel data (pdata) output by the oversampling unit 31 is not changed much from the edge position of the previous time. For this reason, the data rate of the serial communication needs to be an integer multiple of the frequency of the parallel data output by the oversampling unit 31. In a case where the parallel data (pdata) is configured by 12 bits, a maximum frequency that is 12 times the data rate of the serial communication can be used for the oversampling clock. However, in a case where the circuit of the oversampling unit 31 cannot be configured by using this frequency due to a problem of a setup hold time or the like, the oversampling clock (clk) has a frequency that is six times the data rate of the serial communication, and, in a case where the circuit cannot be configured even in such a case, the oversampling clock has a frequency that is four times the data rate, and there is a problem in that the frequency of the oversampling clock (clk) cannot be freely selected.

In addition, in an ASIC or an FPGA (the FPGA is an integrated circuit of which the configuration can be set by a purchaser or a designer after the manufacturing thereof), an IP core of high speed communication such as Gigabit Ethernet (registered trademark) that is generally used widely is prepared, and a means for increasing the number of times of oversampling in a simple manner, in other words, in an easy manner is included therein.

SUMMARY OF THE INVENTION

An object of the present invention, in consideration of the conventional technology described above, is to provide a data recovery circuit, in which there is no dependency between a communication rate of serial data and a frequency of parallel data output by an oversampling circuit, capable of increasing the precision of the circuit by setting an oversampling clock to a maximum frequency.

In order to achieve the object described above, data received through serial communication is oversampled by an IP of high-speed communication, the position of an edge is detected from acquired parallel data, the position of a next edge to come is estimated, the estimated position of the edge is compared with the position of the edge that is actually received, and the sampling position of the parallel data is adjusted.

According to the present invention, there is provided a data recovery circuit sampling serial data, recovering data, and including: an oversampling unit that samples serial data received through serial communication by using a clock having a frequency higher than a communication rate of the serial data and outputs parallel data of n bits (here, n is an integer or two or more) and another clock having a frequency that is 1/n of the frequency of the clock; an edge detection unit that detects an edge position of the parallel data and outputs the detected edge position as edge data; an edge position calculation unit that estimates a next edge position of the parallel data that is output by the oversampling unit based on a phase control signal output by a phase comparison unit, outputs the estimated next edge position as edge estimated position data, and outputs data acquired by shifting the edge estimated position data by a half phase as sampling position data; the phase comparison unit that compares the edge data output by the edge detection unit with the edge estimated position data output by the edge position calculation unit and outputs the phase control signal; and a data sampling unit that extracts data from the parallel data output by the oversampling unit by using information of the sampling position data output by the edge position calculation unit and outputs the extracted data as recovery data together with data enable representing validness of the recovery data.

According to the present invention, also in a case where the communication rate of the serial data is not an integer multiple of the frequency of the parallel data output by the oversampling circuit, the serial data can be recovered. Accordingly, the oversampling clock can be set to a maximum frequency, and the precision of the data recovery circuit can be improved.

In the data recovery circuit described above, an IP core of high-speed communication may be used in the oversampling unit. According to such an embodiment, since the IP of high-speed communication that is designed in advance is used in the oversampling circuit, of which the timing is difficult to adjust, operating at a high frequency, the ASIC can be developed in an easy manner.

According to the present invention, the communication rate of the serial data may not be an integer multiple of the frequency of the parallel data output by the oversampling circuit, and accordingly, the oversampling clock can be set to a maximum frequency, and a data recovery circuit of which the circuit precision can be increased can be provided.

BRIEF DESCRIPTION OF THE DRAWINGS

The forgoing and other objects and feature of the invention will be apparent from the following description of preferred embodiments of the invention with reference to the accompanying drawings, in which:

FIG. 5 is a diagram that illustrates an example of the operation of the edge position calculation unit of the data recovery circuit illustrated in FIG. 1;

FIG. 10 is a diagram that illustrates the operation of an oversampling unit of the data recovery circuit illustrated in FIG. 9.

DETAILED DESCRIPTION OF THE PREFERRED EMBODIMENTS

Figure 1:
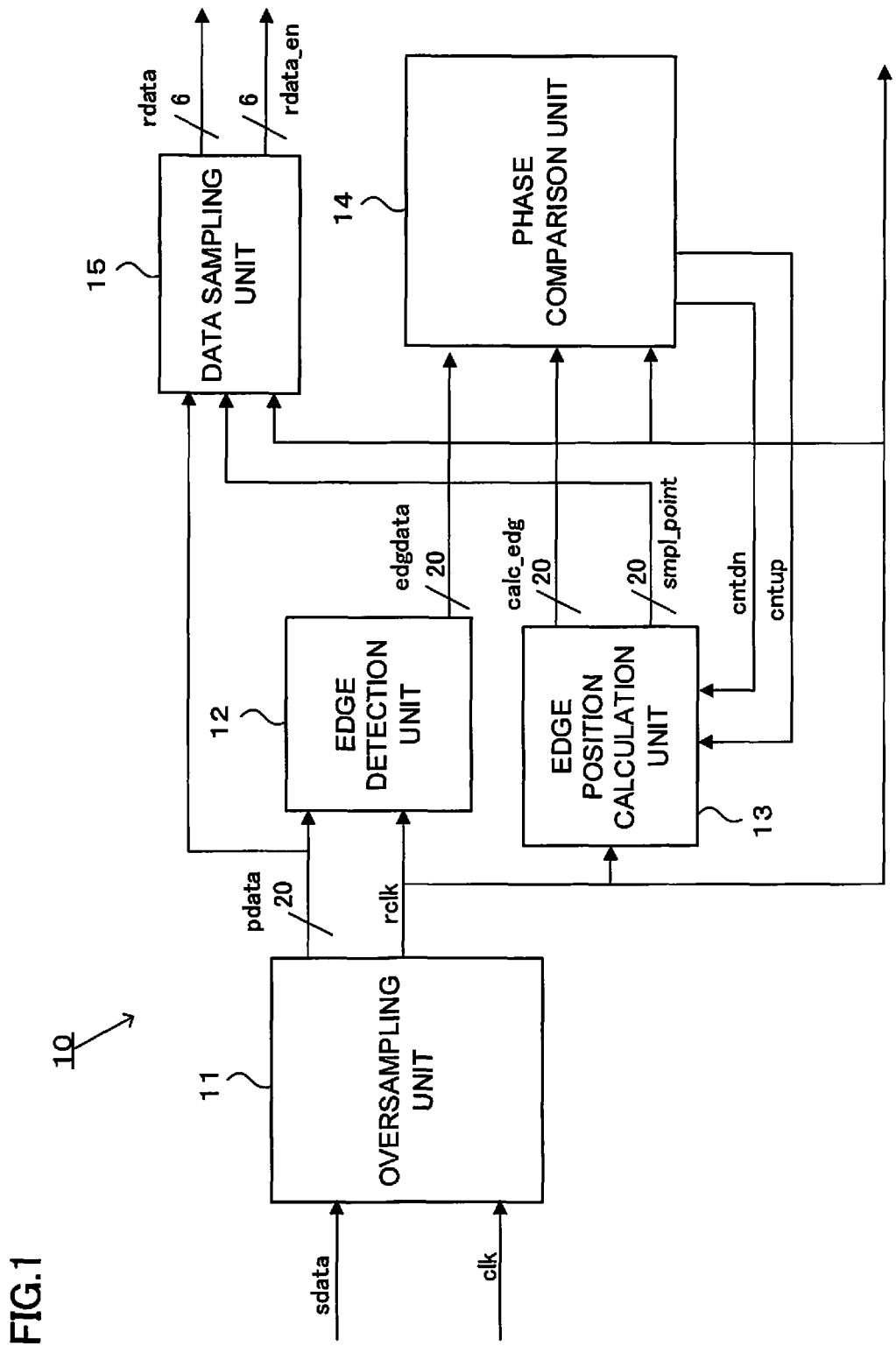
FIG. 1 is a block diagram that illustrates one form of a data recovery circuit according to the present invention.

One embodiment of a data recovery circuit according to the present invention will be described with reference to FIG. 1.

A data recovery circuit 10 includes an oversampling unit 11, an edge detection unit 12, an edge position calculation unit 13, a phase comparison unit 14, and a data sampling unit 15.

The oversampling unit 11 samples data (sdata) received through serial communication using an oversampling clock (clk) that is a clock having a frequency higher than the communication rate of serial data and outputs parallel data (pdata) of n bits and a clock (rclk) having a frequency that is 1/n of the frequency of the clock described above. Here, 'n' is an integer of two or more. This oversampling unit 11 may be an IP for high-speed communication such as Gigabit Ethernet (registered trademark) that is owned by an ASIC vendor or an FPGA manufacturer. Circuits other than the oversampling unit 11 are operated using the clock (rclk) having the 1/n frequency that is output by the oversampling unit 11.

The edge detection unit 12 detects an edge position of parallel data that is output by the oversampling unit 11. The edge position calculation unit 13 estimates the position of an edge of parallel data of the next time that is output by the oversampling unit 11 based on the ratio between a serial communication rate and the frequency of an oversampling clock and a phase control signal output by the phase comparison unit 14. In addition, the edge position calculation unit 13 outputs data that is shifted by a half phase from the estimated position of the edge as sampling position data.

The phase comparison unit 14 compares the position of the edge that is actually detected by the edge detection unit 12 with the edge position that is estimated by the edge position calculation unit 13 and outputs a phase control signal based on a result of the comparison. The data sampling unit 15 extracts recovery data of serial data from parallel data (pdata) of n bits output by the oversampling unit 11 by using information of the sampling position data output by the edge position calculation unit 13 and outputs the extracted recovery data (rdata) and data enable (rdata_en) representing whether or not the recovery data is valid.

As described above, the data recovery circuit 10 outputs the clock (rclk) having the 1/n frequency that is output by the oversampling unit 11, and the recovery data (rdata) and the data enable (rdata_en) that are output by the data sampling unit 15. The data recovery circuit 10 can set the oversampling clock frequency to a maximum value, and accordingly, the precision of the data recovery circuit 10 can be improved. In addition, since the IP of high-speed communication owned by the ASIC vendor or the FPGA manufacturer is used for the oversampling unit 11 that needs to be operated at a high frequency, the development can be easily made, and the development period can be shortened.

Hereinafter, the operation of each unit of the data recovery circuit 10 illustrated in FIG. 1 will be described.

First, an example of the operation of the oversampling unit 11 of the data recovery circuit 10 illustrated in FIG. 1 will be described with reference to FIG. 2.

The oversampling unit 11 samples data (sdata) received through serial communication by using an oversampling clock (clk), thereby acquiring sampling data. The acquired sampling data is output from the oversampling unit 11 as parallel data (pdata) of n bits together with a clock (rclk) having a frequency that is 1/n of the frequency of the oversampling clock (clk). The clock (rclk) having the frequency that is 1/n of the frequency of the oversampling clock is used as a clock for the data recovery circuit 10 other than the oversampling unit 11.

Figure 2:
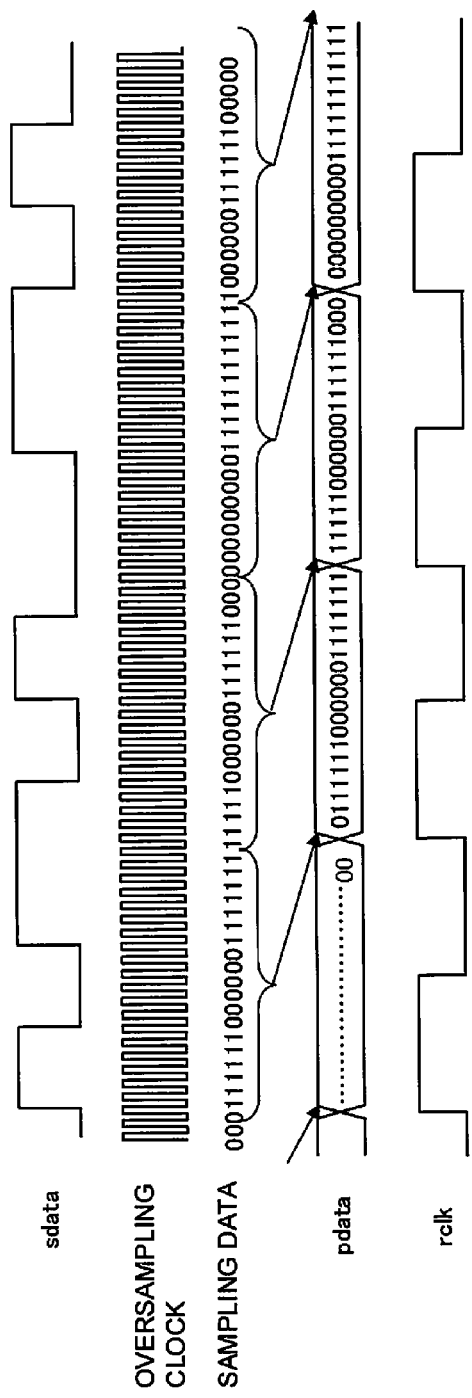
FIG. 2 is a diagram that illustrates an example of the operation of an oversampling unit of the data recovery circuit illustrated in FIG. 1.

While, in an example of the operation illustrated in FIG. 2, the sampling is executed using the oversampling clock (clk) having a frequency that is six times the frequency of the serial data, the parallel data (pdata) of n bits is configured by 20 bits, and the clock (rclk) having the frequency that is 1/n of the frequency of the oversampling clock has a frequency that is ½₀ of the frequency of the oversampling clock (clk), this (n=20) is an example, but the present invention is not limited thereto. This similarly applies to description presented below. By using an IP used for receiving high-speed serial data that has been already owned by the ASIC vendor or the FPGA manufacturer for the oversampling unit 11, the number of development processes can be decreased.

Figure 3:
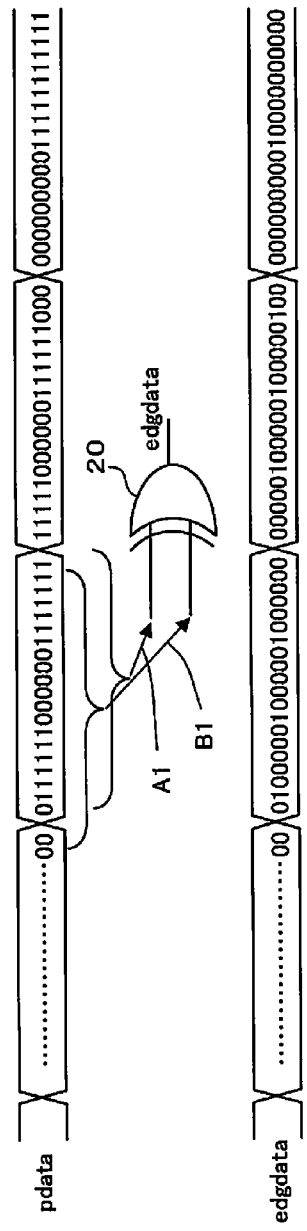
FIG. 3 is a diagram that illustrates an example of the operation of an edge detection unit of the data recovery circuit illustrated in FIG. 1.

Next, an example of the operation of the edge detection unit 12 of the data recovery circuit 10 illustrated in FIG. 1 will be described with reference to FIG. 3.

The edge detection unit 12 detects edge positions of the parallel data output by the oversampling unit 11.

The edge detection unit 12 inputs the parallel data (pdata) (see reference sign A1 illustrated in FIG. 3) of n bits and data (see reference sign B1 illustrated in FIG. 3) acquired by connecting a most significant bit of the parallel data (pdata) of n bits before one clock and a least significant bit to a bit, which is one bit before the most significant bit, of the current parallel data (pdata) of n bits to an exclusive OR circuit 20, and accordingly, the exclusive OR circuit 20 outputs edge position data (edgdata) that represents edge positions of the parallel data (pdata) of n bits.

Figure 4:
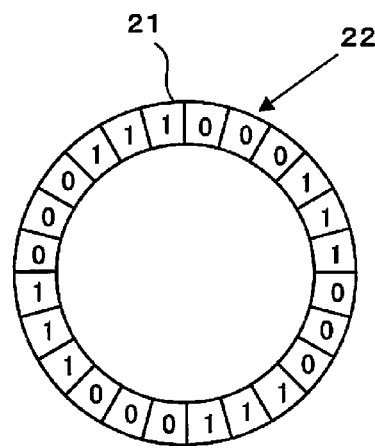
FIG. 4 is a diagram that illustrates a ring buffer used for the calculation of an edge position by an edge position calculation unit of the data recovery circuit illustrated in FIG. 1.

Next, an example of the operation of the edge position calculation unit 13 of the data recovery circuit 10 illustrated in FIG. 1 will be described with reference to FIGS. 4 and 5.

The edge position calculation unit 13 arranges a ring buffer 21 (FIG. 4) in which inversion between "0" and "1" is made for every number of bits that is a half of the ratio between the data rate of the serial communication and the frequency of the oversampling clock (clk) used by the oversampling unit 11. In the example illustrated in FIG. 5, since oversampling is executed at a six-times frequency for one bit of the serial data, 0's and 1's are continued for every three (=6÷2) bits.

20 bits corresponding to the bit length of the parallel data (pdata) of n bits acquired in the clockwise direction from a reading pointer 22 (FIG. 4) representing a start reading position are output as edge estimated position data (calc_edg) (FIG. 5). Basically, the reading pointer 22 advances by 20 that is the same as the bit length of the parallel data (pdata) of n bits in the clockwise direction for each clock. However, in a case where a signal cntup or cntdn representing a change in the phase is input from the phase comparison unit 14 to be described later, the reading pointer advances by 19 that is less than the bit length (20) of the parallel data (pdata) of n bits by one or 21 that is more than the bit length of the parallel data by one.

The edge estimated position data (calc_edg) is controlled so as to locate each edge of the parallel data (pdata) of n bits at a position at which the bit changes from "0" to "1". For this reason, each sampling position of the parallel data (pdata) of n bits is a position at which the edge estimated position data (calc_edg) changes from "1" to "0". By inputting data (see reference sign B2 illustrated in FIG. 5) acquired by connecting a most significant bit of the edge estimated position data (calc_edg) before one clock and a least significant bit of the current edge estimated position data (calc_edg) to a bit that is one bit before a most significant bit thereof and an inverted current edge estimated position data (calc_edg) (see reference sign A2 illustrated in FIG. 5) to an AND circuit 23, and accordingly, the AND circuit 23 outputs smple_point that represents each sampling position of the parallel data (pdata) of n bits as an output.

Figure 6:
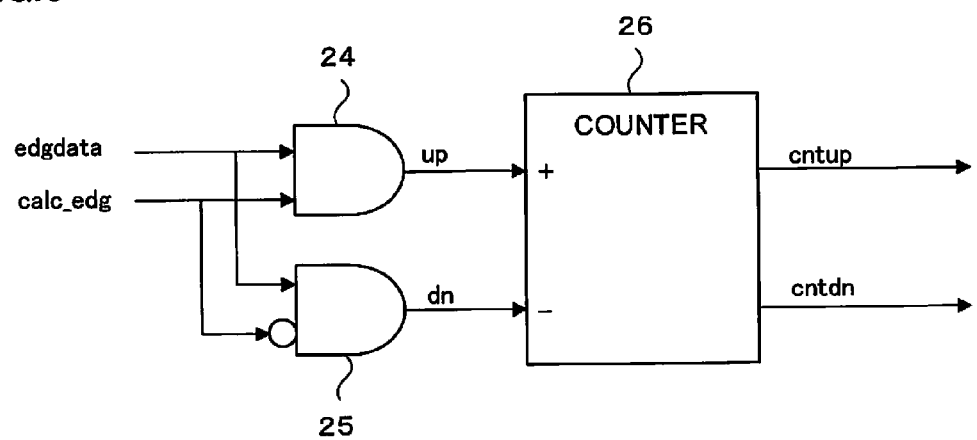
FIG. 6 is a diagram that illustrates two logic circuits and a counter used for the comparison of phases by a phase comparison unit illustrated in FIG. 1.
Figure 7:
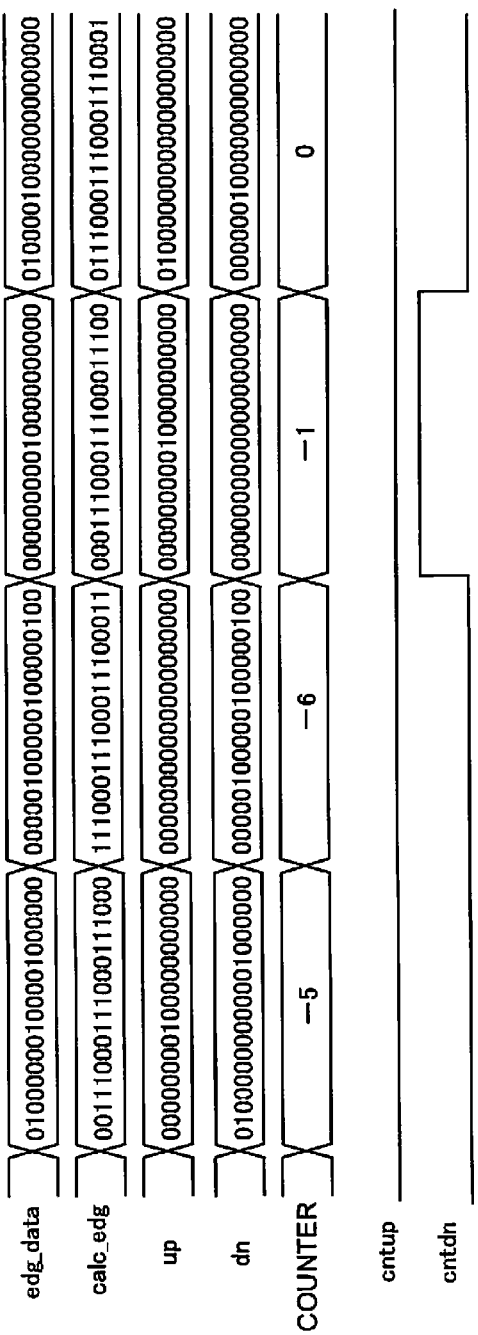
FIG. 7 is a diagram that illustrates an example of the operation of the phase comparison unit of the data recovery circuit illustrated in FIG. 1.

Next, an example of the operation of the phase comparison unit 14 of the data recovery circuit 10 illustrated in FIG. 1 will be described with reference to FIGS. 6 and 7.

The phase comparison unit 14, first, compares the edge position data (edgdata) with the edge estimated position data (calc_edg), thereby monitoring whether the phase of the serial data leads or lags. Since the edge estimated position data (calc_edg) is controlled so as to locate an ideal edge at a position at which the bit changes from "0" to "1", by inputting the edge position data (edgdata) and the edge estimated position data (calc_edg) to the AND circuit 24, "1" is output to a signal up representing a lag in a case where the edge lags. In addition, by inputting the edge position data (edgdata) and the inverted edge estimated position data (calc_edg) to the AND circuit 25 illustrated in FIG. 6, "1" is output to a signal dn representing a lead in a case where the edge leads.

In a case where such signals up and dn are directly used for the phase control process, the responsiveness is increased too much, and there is a possibility of sensitively reacting to a noise, a jitter, or the like, and thus, an appropriate filtering process is necessary. For example, similar to the technology disclosed in JP 2006-262165 A described above, such signals are input to a counter 26, and phase control signals cntup and cntdn are output at a time point at which the signals are input several times. More specifically, when a signal up is input to the counter 26, the value of the counter is increased by one, and, when a signal dn is input to the counter, the value of the counter is decreased by one. Then, when the value of the counter becomes +8, the phase control signal cntup is output, and the value of the counter is returned to zero. On the other hand, when the value of the counter becomes −8, the phase control signal cntdn is output, and the value of the counter is returned to zero. In the example of the operation illustrated in FIG. 7, when second data is input, the value of the counter is −6, and the signal dn is input three times. Accordingly, at the next clock, the value of the counter 26 becomes −8−1, the phase control signal cntdn is output, and the value of the counter becomes −1. Such phase control signals cntup and cntdn are input to the edge position calculation unit 13 described above and are used for the phase control process.

Figure 8:
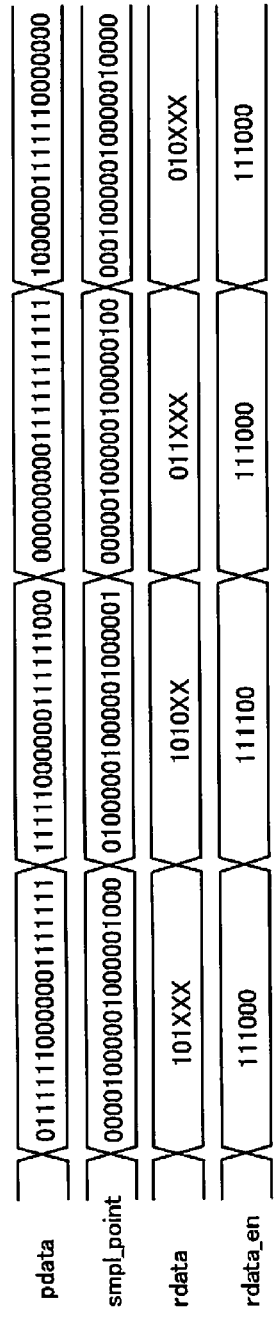
FIG. 8 is a diagram that illustrates an example of the operation of a data sampling unit of the data recovery circuit illustrated in FIG. 1.
Figure 9:
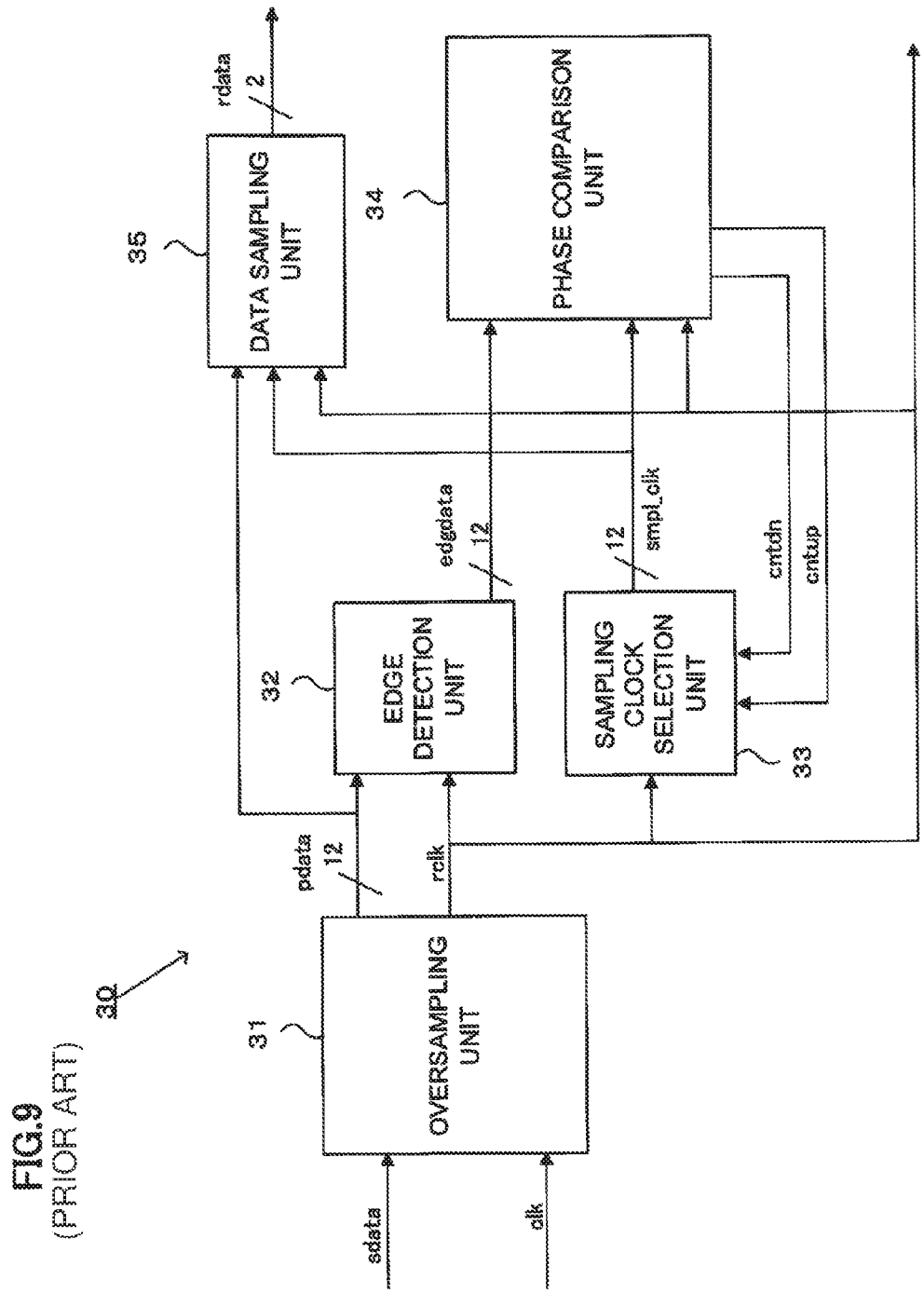
FIG. 9 is a block diagram that illustrates a conventional data recovery circuit.

Next, an example of the operation of the data sampling unit 15 of the data recovery circuit 10 illustrated in FIG. 1 will be described with reference to FIG. 8.

The data sampling unit 15 outputs the parallel data (pdata) that is located at a position of a bit having a value of "1" in smple_point to recovery data (rdata). In addition, the data sampling unit 15 outputs the number of bits each having a value of "1" in smple_point with the data enable (rdata_en) set to "1". The reason why each of the recovery data (rdata) and the data enable (rdata_en) is configured by 6 bits in the example illustrated in FIG. 8 is that the data sampling unit is considered to be used also at a different data rate of serial communication.

The invention claimed is:

1. A data recovery circuit that samples serial data and recovers data, the data recovery circuit comprising:

an oversampling unit that samples serial data received through serial communication by using a clock having a frequency higher than a communication rate of the serial data and outputs parallel data of n bits (here, n is an integer or two or more) and another clock having a frequency that is 1/n of the frequency of the clock;

an edge detection unit that detects an edge position of the parallel data and outputs the detected edge position as edge data;

an edge position calculation unit that estimates a next edge position of the parallel data that is output by the oversampling unit based on a phase control signal output by a phase comparison unit, outputs the estimated next edge position as edge estimated position data, and outputs data acquired by shifting the edge estimated position data by a half phase as sampling position data;

the phase comparison unit that compares the edge data output by the edge detection unit with the edge estimated position data output by the edge position calculation unit and outputs the phase control signal; and a data sampling unit that extracts data from the parallel data output by the oversampling unit by using information of the sampling position data output by the edge position calculation unit and outputs the extracted data as recovery data together with data enable representing validness of the recovery data.

2. The data recovery circuit according to claim 1, wherein an IP core of high-speed communication is used in the oversampling unit.

* * * * *